United States Patent

Heddes et al.

[11] Patent Number: 5,311,509
[45] Date of Patent: May 10, 1994

[54] CONFIGURABLE GIGABITS SWITCH ADAPTER

[75] Inventors: Marco Heddes, Kilchberg; Ronald Luijten, Oberrieden, both of Switzerland

[73] Assignee: International Business Machines Corporation, Armonk, N.Y.

[21] Appl. No.: 832,127

[22] Filed: Feb. 6, 1992

[30] Foreign Application Priority Data

Sep. 13, 1991 [EP] European Pat. Off. ........ 91810728.5

[51] Int. Cl.⁵ ............................................. H04L 12/56
[52] U.S. Cl. ......................................... 370/60; 370/82; 370/94.1
[58] Field of Search ................... 370/60, 60.1, 82, 94.1, 370/99

[56] References Cited

U.S. PATENT DOCUMENTS

| | | | |
|---|---|---|---|
| 4,956,839 | 9/1990 | Torii et al. | 370/94.1 |
| 5,101,404 | 3/1992 | Kunimoto et al. | 370/60.1 |
| 5,163,045 | 11/1992 | Caram et al. | 370/60.1 |
| 5,165,021 | 11/1992 | Wu et al. | 370/60.1 |

FOREIGN PATENT DOCUMENTS

| | | |
|---|---|---|
| 0113639 | 7/1984 | European Pat. Off. . |
| 0299473 | 1/1989 | European Pat. Off. . |
| 0355797 | 2/1990 | European Pat. Off. . |
| 0425772 | 5/1991 | European Pat. Off. . |

OTHER PUBLICATIONS

International Switching Symposium 1990, Stockholm. vol. 6, pp. 5-10.

*Primary Examiner*—Benedict V. Safourek
*Attorney, Agent, or Firm*—Joscelyn G. Cockburn

[57] ABSTRACT

The present invention relates to a data transmission system and concerns a method for transforming user frames into fixed length cells, e.g. ATM (Asynchronous Transfer Mode), such that the fixed length cells can be transported through a cell handling switch fabric (11). A hardware implementation of this method consists of two parts, a transmitter (12.1) and a receiver (13.1), both being part of a switching subsystem (10) comprising a switch fabric (11). The transmitter (12.1) buffers user data and segments them into fixed length cells to be transported through said switch (11). The receiver part (13.1) reassembles user data on reception of these cells.

17 Claims, 13 Drawing Sheets

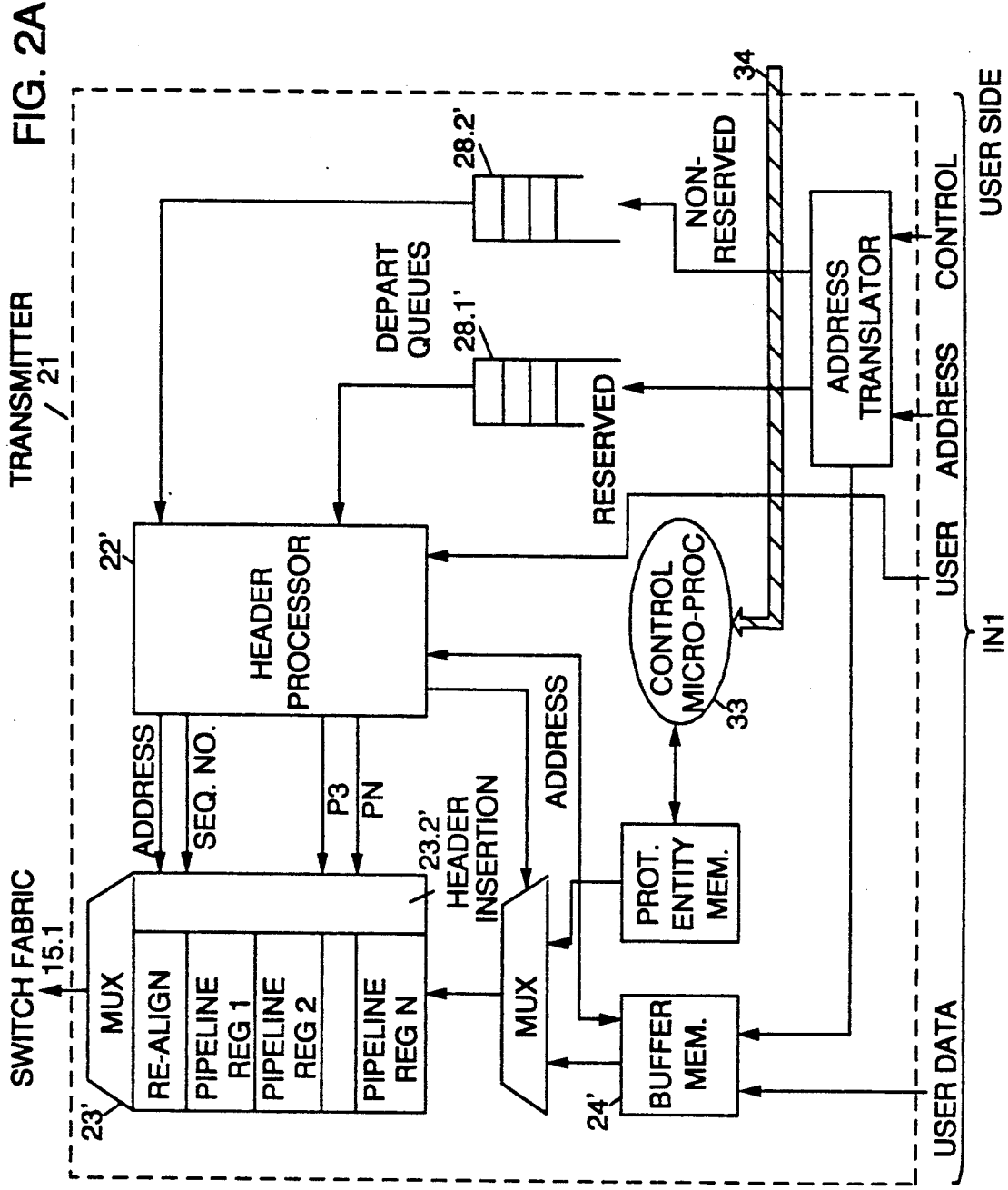

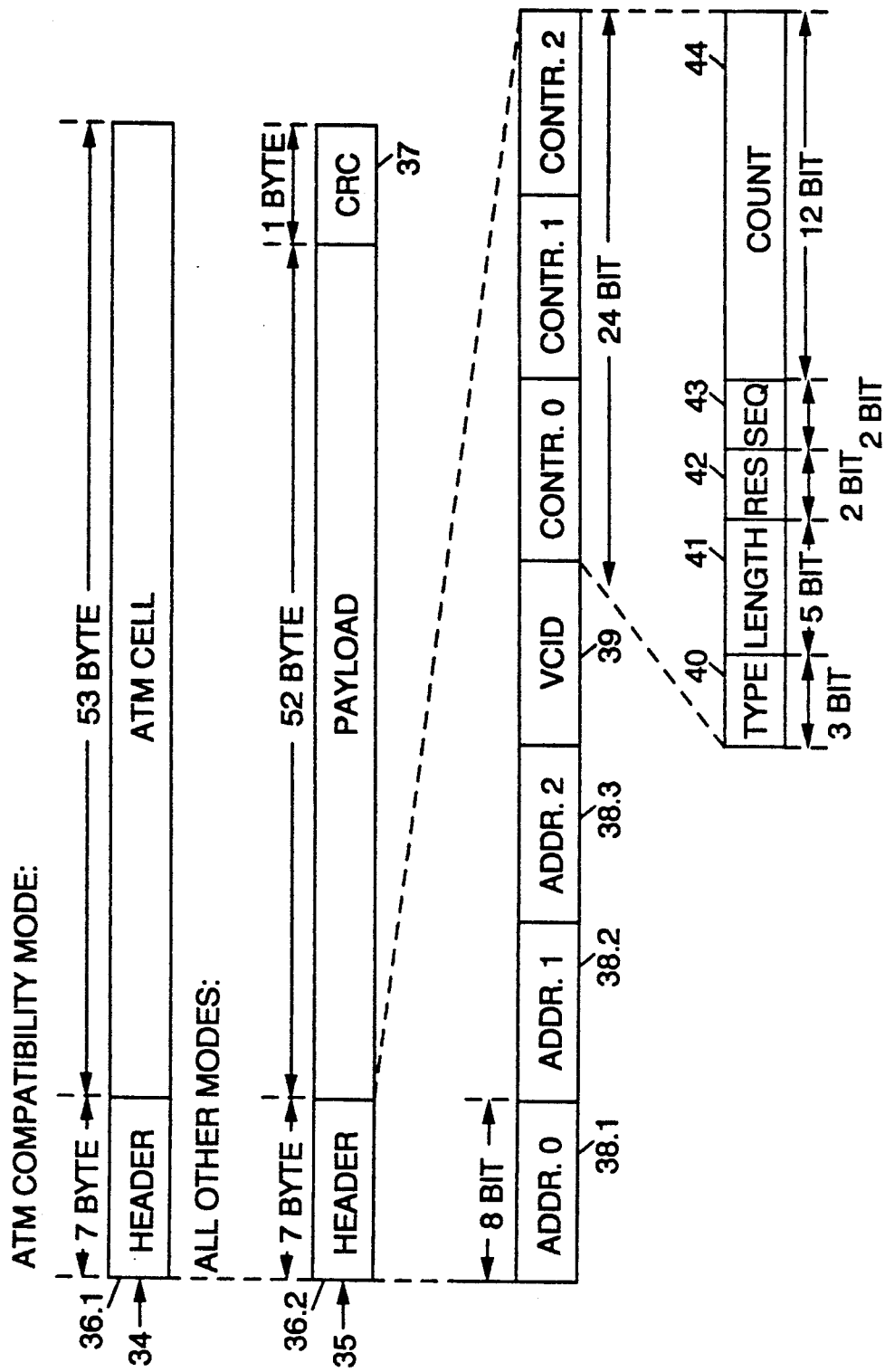

FIG. 6
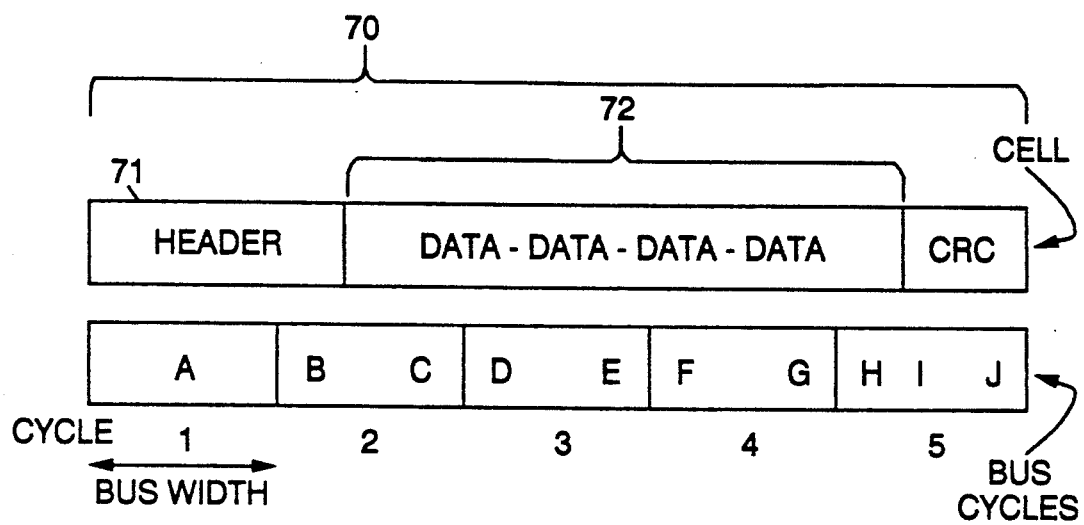
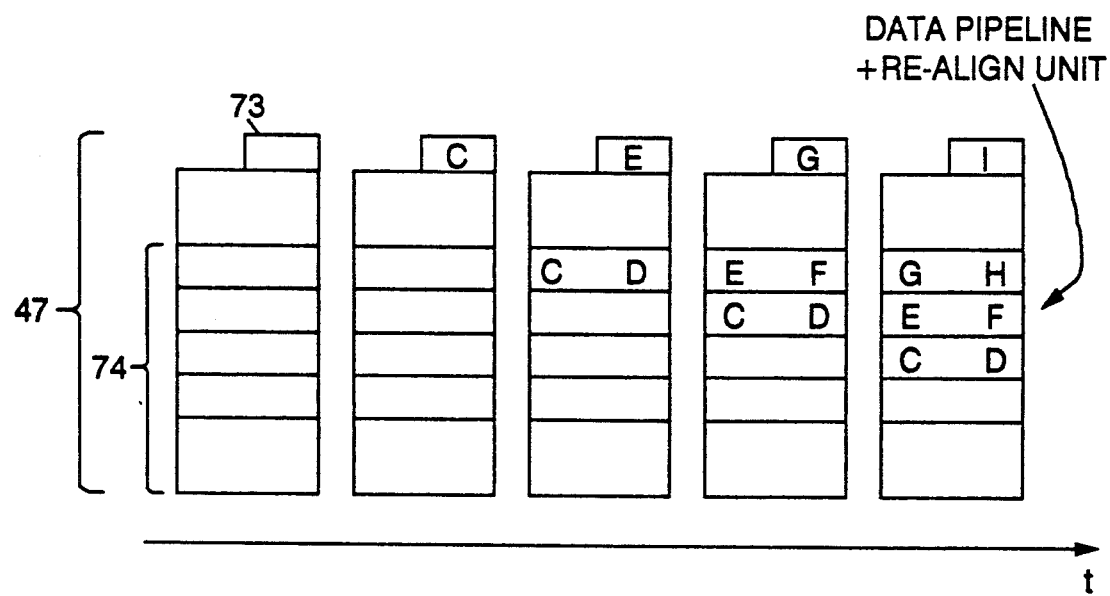

FIG. 7

| FIG. 7A | FIG. 7B | FIG. 7C |
|---|---|---|

FIG. 7A

| CELL TYPE | 1 | 2 | 3 | 4 |
|---|---|---|---|---|
| FIRST | CLOCK HEADER INTO HDRPROC (ADDR PART) | INDEX VIRTUAL CHANNEL ENTRY (CAM FUNCT.) INPUT REST OF HEADER | CLOCK STATE IN WORKING REG | BUFFER MAN. CYCLE DETERMINE NEXT STATE, COMPARE SEQ FIELD |
| MIDDLE | CLOCK HEADER INTO HDRPROC (ADDR PART) | INDEX VIRTUAL CHANNEL ENTRY (CAM FUNCT.) INPUT REST OF HEADER | CLOCK STATE IN WORKING REG | BUFFER MAN. CYCLE DETERMINE NEXT STATE, COMPARE COUNT & SEQ FIELD |
| LAST | CLOCK HEADER INTO HDRPROC (ADDR PART) | INDEX VIRTUAL CHANNEL ENTRY (CAM FUNCT.) INPUT REST OF HEADER | CLOCK STATE IN WORKING REG | BUFFER MAN. CYCLE DETERMINE NEXT STATE, COMPARE COUNT & SEQ FIELD |
| ONLY | CLOCK HEADER INTO HDRPROC (ADDR PART) | INDEX VIRTUAL CHANNEL ENTRY (CAM FUNCT.) INPUT REST OF HEADER | CLOCK STATE IN WORKING REG | BUFFER MAN. CYCLE DETERMINE NEXT STATE, COMPARE COUNT & SEQ FIELD |

FIG. 7B

| CELL TYPE | 5 | 6 | 7 |
|---|---|---|---|
| FIRST | BUFFER MAN. CYCLE SAVE SEQ FIELD INC COUNT | BUFFER MAN. CYCLE SELECT DEMUX | BUFFER MAN. CYCLE |
| MIDDLE | BUFFER MAN. CYCLE INC COUNT | BUFFER MAN. CYCLE SELECT DEMUX | BUFFER MAN. CYCLE |
| LAST | BUFFER MAN. CYCLE INC COUNT | BUFFER MAN. CYCLE SELECT DEMUX | BUFFER MAN. CYCLE |
| ONLY | BUFFER MAN. CYCLE SAVE SEQ FIELD INC COUNT | BUFFER MAN. CYCLE SELECT DEMUX | BUFFER MAN. CYCLE |

FIG. 7C

| CELL TYPE | 8 | 9 | 10 | 11 |
|---|---|---|---|---|
| FIRST | PRESENT MEM ADDR WRITE ADDR IN VC FIFO | NOP | NOP | WRITE NEW STATE INTO VC STRUCT. |
| MIDDLE | PRESENT MEM ADDR WRITE ADDR IN VC FIFO | NOP | NOP | WRITE NEW STATE INTO VC STRUCT. |
| LAST | PRESENT MEM ADDR WRITE ADDR IN VC FIFO | MESSAGE TO PROCESSOR | NOP | WRITE NEW STATE INTO VC STRUCT. |
| ONLY | PRESENT MEM ADDR WRITE ADDR IN VC FIFO | MESSAGE TO PROCESSOR | NOP | WRITE NEW STATE INTO VC STRUCT. |

WRITING DATA INTO BUFFER

ABCD: DATA OF VC 0.    abcd: DATA OF VC 1.

CONFIGURABLE GIGABITS SWITCH ADAPTER

TECHNICAL FIELD

The present invention relates to a data transmission system and concerns a method for transforming user frames into fixed length cells, e.g. ATM cells (Asynchronous Transfer Mode), such that the fixed length cells can be transported through a cell handling switch fabric. A hardware implementation of this method consists of two parts, a transmitter and a receiver, both being part of a switching subsystem comprising a switch fabric. The transmitter buffers user data and segments them into fixed length cells to be transported through said switch. The receiver part reassembles user data on reception of these cells.

BACKGROUND OF THE INVENTION

With the growing amount of data to be transmitted and the increasing number of data channels which have to be supported, fast switching of information becomes more and more an important task in any communication network. The network nodes in which lines or transmission links are interconnected so that information may be exchanged between them are often cause of delay in the network. It is therefore desirable to have switching elements being fast and practically non-blocking. New possibilities are given by switch fabrics interconnecting several inputs and outputs. The advantages made in switching technology allow the construction of switch fabrics for wideband band and high speed communication.

These switches must perform two basic functions at high speed. First, they have to route the traffic arriving on its inputs to the appropriate outputs with high reliability. Second, the switch must deal with output contention, where traffic arriving at the same time on two or more inputs may be destined for a common output.

With circuit switching, output contention is no problem as a controller is used to schedule arrivals and avoid conflicts. With packet switching, however, packets arriving at a switch are unscheduled, each containing a header with address information. Without the coordination by a central scheduler, the received packets have to be buffered to prevent problems at the outputs. A descriptive overview of the major recent activities on the field of packet switches is given by an article of H. Ahmadi et al., "A Survey of Modern High-Performance Switching Techniques", IEEE J. SAC, Vol. 7, No. 7, September 1989, pp. 1091-1103. A typical packet switch is described in the article "The Knockout Switch: A Simple, Modular Architecture For High-Performance Packet Switching", of Y. S. Yeh et al., XII International Switching Symposium ISS'87, Phoenix, Ariz. USA, Mar. 15-20, 1987, paper B10.2, or in the article "The Knockout Switch: A Simple, Modular Architecture For High-Performance Packet Switching", of the same authors, IEEE Journal on Selected Areas in Communication, Vol. SAC-5, No. 8, October 1987, pp. 1274-1283. The switching element described by Yeh et al. comprises a 'concentrator' to concentrate the packets arriving on the N input lines onto a smaller number of L lines. A 'round robin server' is used to take the packets from the L output lines and store them in the first available FIFO buffer connected to the output to which the packet is directed. L separate FIFO buffers are used in the design to cater for the worst possible case that one time slot L packets emerge from the concentrator. Another example of a packet switch is the buffered Fast Packet Switching module described in "Packet Switching Module", W. Denzel et al., IBM Technical Disclosure Bulletin, Vol. 32, No. 10B, March 1990, pp. 176-177. In this switch, the destination headers are separated on arrival in the switch from the data packets. These packets are stored in a specified address within a packet buffer memory and then this buffer address is passed through the control section of the packet switching module. At the outputs of the switch, the buffer address is used to retrieve the data packet from the packet buffer memory.

Most of the recent proposals for those high-performance switching fabrics have been based on the principle known as fast packet switching (FPS). As described in the above cited Technical Disclosure Bulletin article, a high degree of parallelism, distributed control, and routing performed on the hardware level is necessary for these kind of switches. For the employment of these switches in communication networks, data have to be adapted to the underlying cell structure of the switch.

The Packet Switching Module, as referenced above, transports data in fixed length cells from the inputs to the outputs. One example for a fixed length cell is an ATM cell consisting of a header and a cell data field. For the usage of this switch in different systems an adapter has to be employed which transports data frames, as sent by a user, through said switch.

The present invention relates to a method for transforming user frames into fixed length cells and for re-assembling fixed length cells to the original user frames. Data sent by a user are segmented into fixed length cells, as required by the switch fabric, transported through the switch and re-assembled at its output. A hardware implementation of this method, as hereinafter described, comprises two parts called transmitter and receiver. This transmitter is receiving user data segments them into fixed length cells and transmits them to the switch fabric. These fixed length cells are routed through the switch and received by said receiver, which re-assembles these cells into user frames. The transmitter, switch fabric, and receiver are part of a switching subsystem, such that a user is sending user frames to the switch without knowing the underlying transport mechanism.

SUMMARY OF THE INVENTION

The main object of the present invention is to provide for a method to transform user frames into fixed length cells as required by a switch, and fixed length cells into user frames on the other side.

Another object is the implementation of the method in an adapter for high speed communication.

The invention as hereinafter described and claimed meets the objectives by providing for separation of the header with control information and the payload, such that both parts can be processed parallel. By processing the header on-the-fly, a storage section for the payload is allocatable within a fixed number of clock cycles. The reliability of the method, and its hardware implementation, is improved by providing for error detection and recovery. In addition high speed buffer management, as described in the European Patent Application 91810548.7, "High Speed Buffer Management", can be employed and multiple virtual channels are supported.

DESCRIPTION OF THE DRAWINGS

The invention is described in detail below with reference to the following drawings.

FIG. 2A shows a detailed block diagram of the transmitter part of a protocol adapter.

FIG. 3 shows fixed length cells with fixed length headers.

FIG. 6 shows a time diagram of a re-alignment and pipelining example.

FIG. 7A-C shows a header processor cycle diagram.

GENERAL DESCRIPTION

The purpose of the adapters hereinafter described in greater detail, is to transport data frames, herein referred to as user frames, such as those from CRMA (Cyclic Reservation Multiple Access) or OC24/48 (Optical Channel 1,2/2,4 Gb/sec optical connection standard), through a switch using its underlying cell transport mechanism. These switches require data to be sent in a fixed cell format, and the adapters perform the segmentation of the user frames into the fixed size cells and the inverse re-assembly process. Adapters configured or programmed for e.g. CRMA transform the user frames, which originate from the CRMA network, to fixed length cells, after which these are routed through the switch fabric and received by a receiving adapter which need not necessary be connected to the same kind of network (CRMA) as the transmitting adapter.

An adapter consists of a transmitting and receiving part, and is connected to a switch by means of an input-/output line. Multiple adapters may be connected to a switch fabric.

Figure 1:
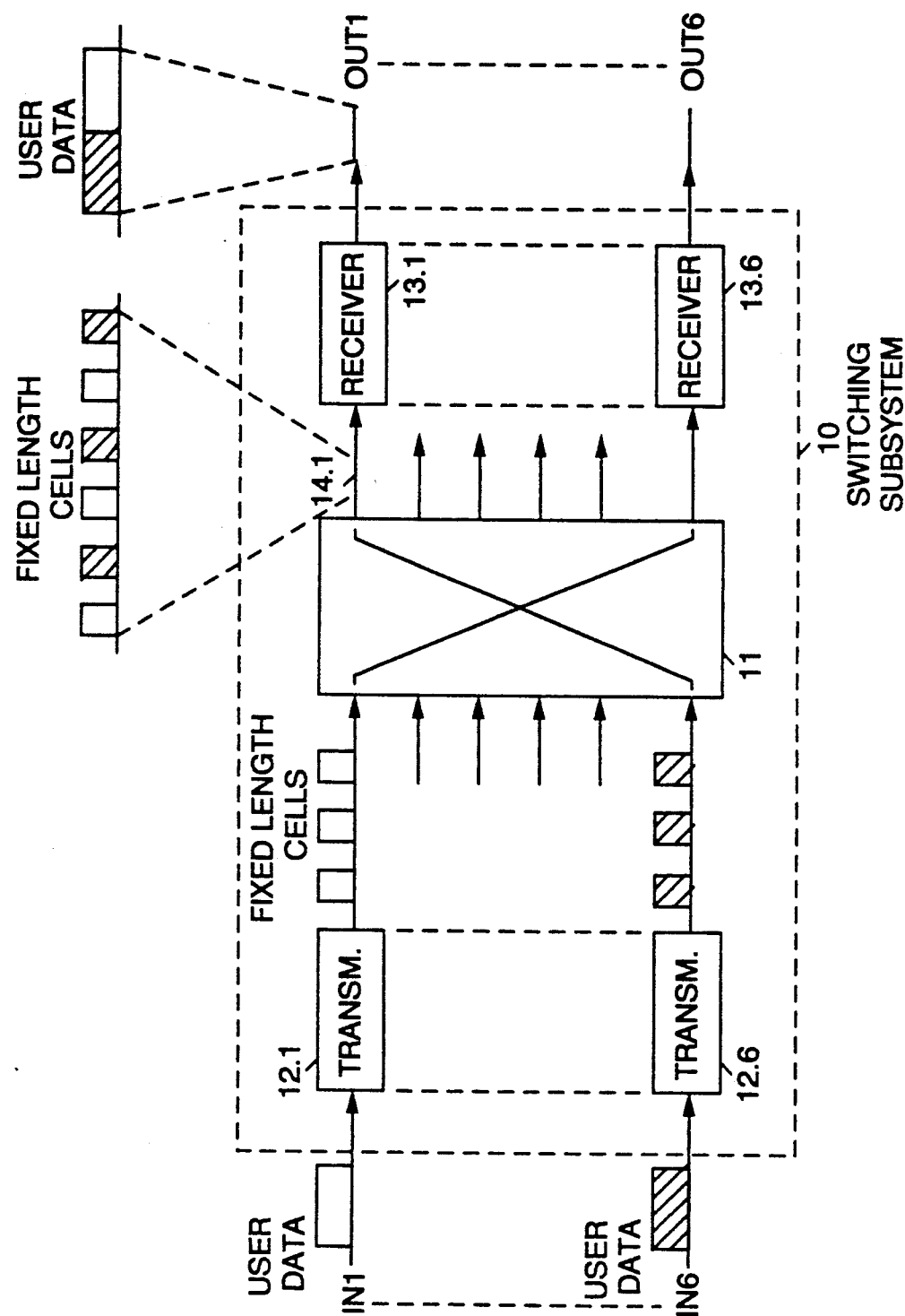
FIG. 1 shows a global block diagram of a switching subsystem comprising a hardware implementation of the present invention.

A block diagram of a switching subsystem 10 is shown in FIG. 1. This system comprises a switch fabric element 11 with 6 input and 6 output lines. Users, not shown, are connected via the transmitter parts 12.1-12.6 of adapters to the input lines of the switch fabric element 11. The receiver parts 13.1-13.6 are situated at the output lines of the switch 11. In the shown block diagram, user frames arriving at the input line (IN1) are segmented by the transmitter 12.1 into fixed length cells which are routed by the switch fabric to the output 14.1. User frames of input (IN6) are segmented by transmitter 12.6 and routed to the same output 14.1. The receiver 13.1 connected to this output line re-assembles user frames and sends them via output line (OUT1) to the addressee of the data.

The basic functions of an adapter implementation based on the method according to the invention are listed below:
Segmentation and re-assembly,
Error detection and recovery,
Support of user frames with different priority,
Data buffering,
Buffer management,
Support of multiple virtual channels.

The following description of a first embodiment of the present invention concentrates mainly on the receiver part of an adapter. The transmitter part operates in an analogous fashion as the receiver, as illustrated in connection with FIGS. 2A and 2B. Data frames, originating from a user, are stored in buffer memory 24'. The depart queues 28.1' and 28.2' contain pointers to user frames which are to be transmitted. The header processor 22' reads a pointer from a depart queue (taking into account any required priority rule) and starts transmitting the corresponding frame as hereinafter described. The databytes, stored in buffer memory 24', are read into a pipeline-realignment unit 23'. A fixed cell is formed by prefixing a fixed number of databytes with a header, which originates from the header processor 22'(This is done by a header insertion unit 23.2', being part of 23'). An appropriate implementation of the header processor 22' may allow for interruption of data a frame being transmitted by a data frame which has a higher priority.

The first embodiment is a universal and programmable high speed (in the Gigabit/s range) protocol adapter for a switch fabric. Four new principles for such an adapter are described below. The first principle is separation of protocol data and control cells, which supports a separation of data and control signals in hardware. The second principle is on-the-fly processing of cells if no errors are detected. The third principle is the support of user frames having different priorities, by keeping the addresses where these data are buffered in additional queues, and the last principle is the programmability of the adapter. Not only the control processor thereof, but also various hardware structures are programmable.

The separation of payload and control information, which is one of the basic principles, is enforced by defining data mode operations. These are operations being executed in the data transfer state while no errors occur. The connection setup, negative acknowledgements, and control cells, etc. are not part of this data mode state, whereas positive acknowledgements are part of it.

Figure 2B:
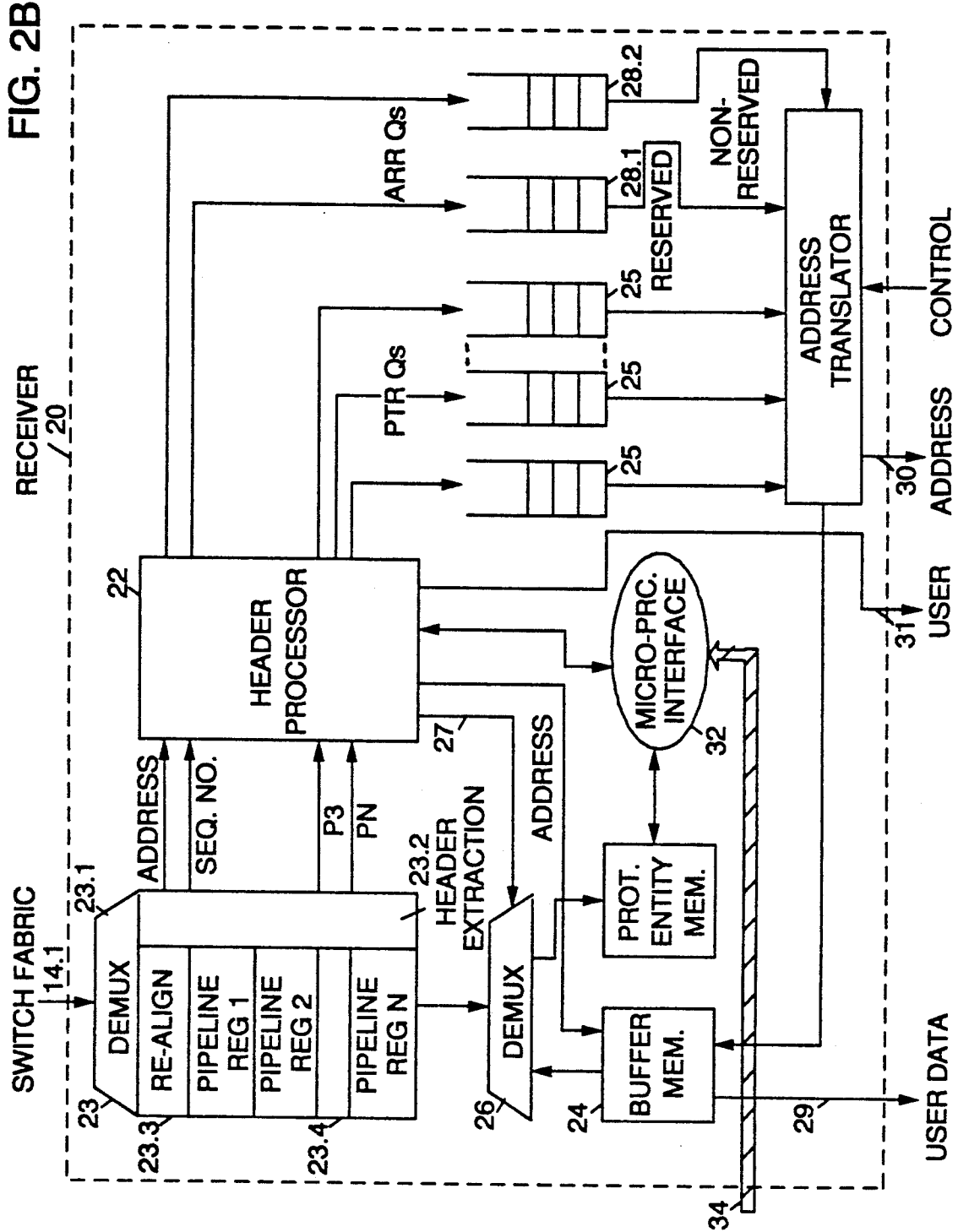
FIG. 2B shows a detailed block diagram of the receiver part of a protocol adapter.

FIGS. 2A and 2B show the principle architecture of the switch adapter hardware 20, 21 of the first embodiment. The incoming fixed length cells, arriving from the switch fabric at input line 14.1 are processed on-the-fly, and the parameters in the cell headers are extracted and presented to a header processor 22. The header/data separation takes place in a DEMUX/Header extraction part 23.1, 23.2 of unit 23. The parameters are fed via interconnection lines from the header extraction unit 23.2 to said header processor 22. The cell data field, herein referred to as cell payload, continues to flow via the re-alignment/pipeline part 23.3, 23.4 of unit 23 into buffers of a shared storage 24. The address of a respective buffer is generated by the header processor 22 in combination with pointer queues 25, as described below. Whilst the cell payload is re-aligned and delayed after being separated from the header comprising control data, the buffer address is generated. The header processor 22 switches the DEMUX unit 26 via select line 27 such that the cell payload can be stored by applying the buffer address to the storage 24.

Figure 8:
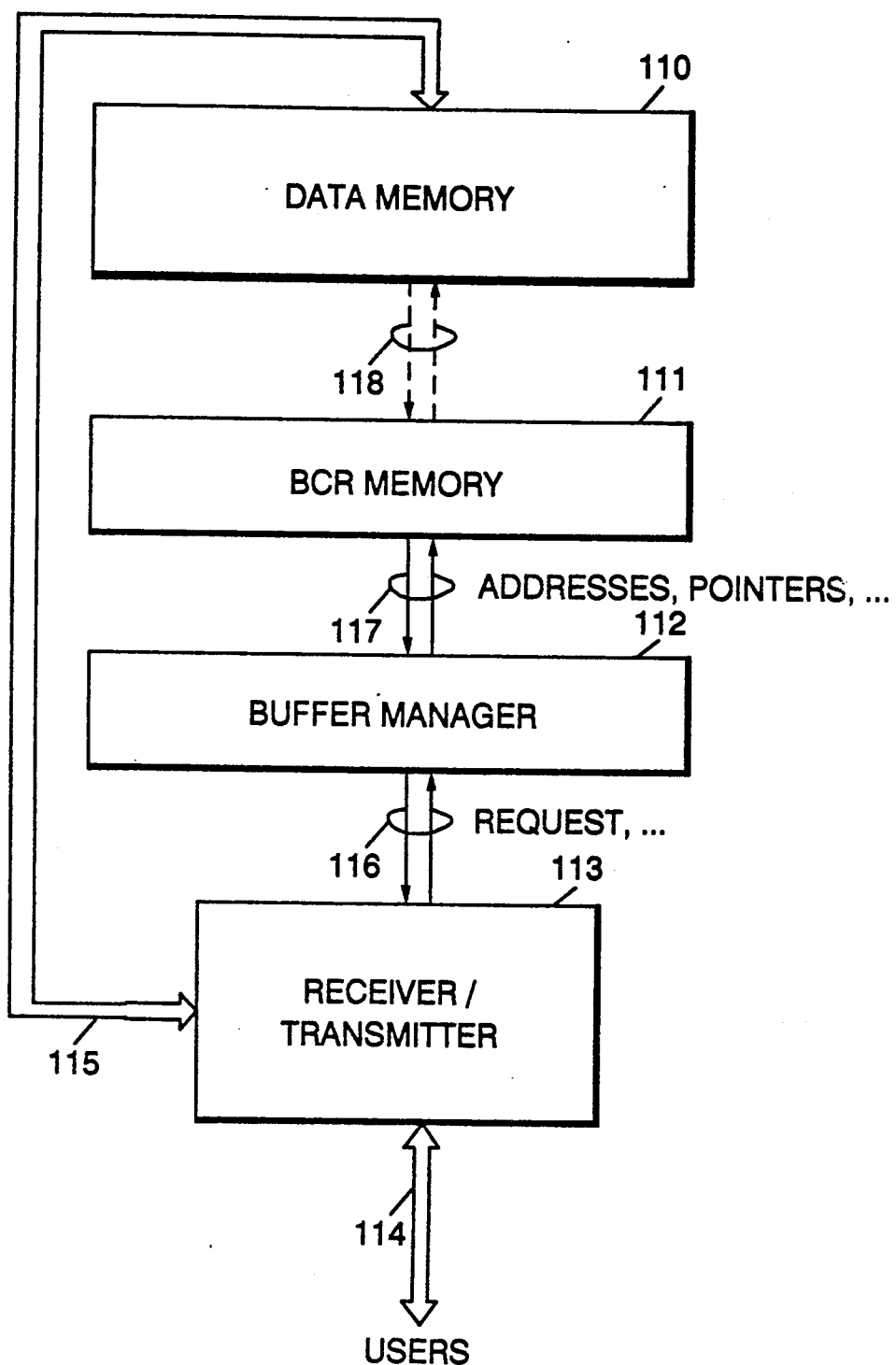
FIG. 8 shows a global block diagram of the buffer management systems inside the header processor.

Buffers are generated and managed by a buffer management system contained in the header processor. The buffer management system comprises three main parts, a large data memory 110, a buffer-control-record memory (BCR memory) 111, and a buffer manager 112, as shown in FIG. 8. Both memories 110 and 111 are random access memories (RAMs). The BCR memory 111 is subdivided into as many buffer-control-records (BCRs) as buffers exist in the data memory 111, controlled and organized by the buffer manager 112. Multiple users (virtual channels) are connected via a bus 114 to a receiver/transmitter unit 113. On reception of data from a user, one or more buffers are requested depending on the needed space for the data. If there are enough free buffers available and the rules implemented in the buffer manager 112 are satisfied, the request will be granted by the manager 112. The requested free buffers are popped from a free buffer linked list being kept in the BCR memory 111, and the addresses of the buffers are made available to the buffer manager 112 and the receiver 113. With these addresses, hereinafter referred to as "Userdata," the buffers are allocated in the random-access data memory 110 and the receiver 113, and therewith the user itself has access to the data memory 110.

Figure 9:
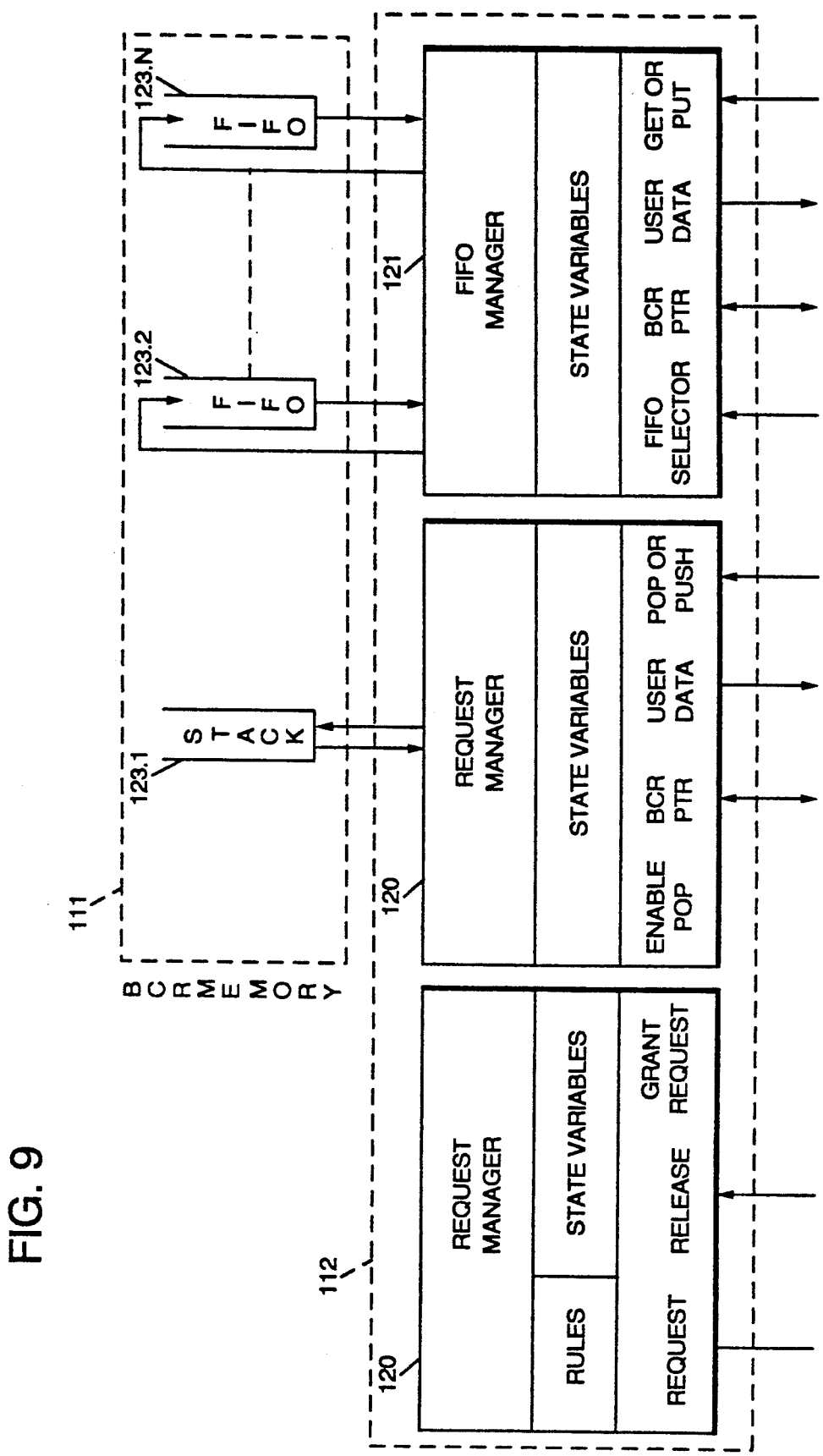
FIG. 9 shows a buffer manager with stack and FIFO linked lists being stored in BCR memory.

The buffer manager 112 consists of three building blocks, a request manager 120, a stack manager 121, and a first-in/first-out manager (FIFO manager) 122, as illustrated in FIG. 9. The request manager 120 does or does not grant the requests for buffers. If a request is granted by the request manager 120, the BCR corresponding to the free buffer being requested, is popped form the free buffer linked list in the BCR memory 111, being kept and controlled by the stack manager 121. The BCRs of free buffers are kept in a stack 123.1. The UserData of the buffers being popped from the stack 123.1 are made available such that the corresponding buffers become accessible. Allocated buffers are kept in logical queues, one for each user, by adding its BCRs to first-in/first-out linked lists 123.2-123.n. The buffers are recycled by processing them using the FIFOs 123.2-123.n and the stack 123.1.

Figure 10:
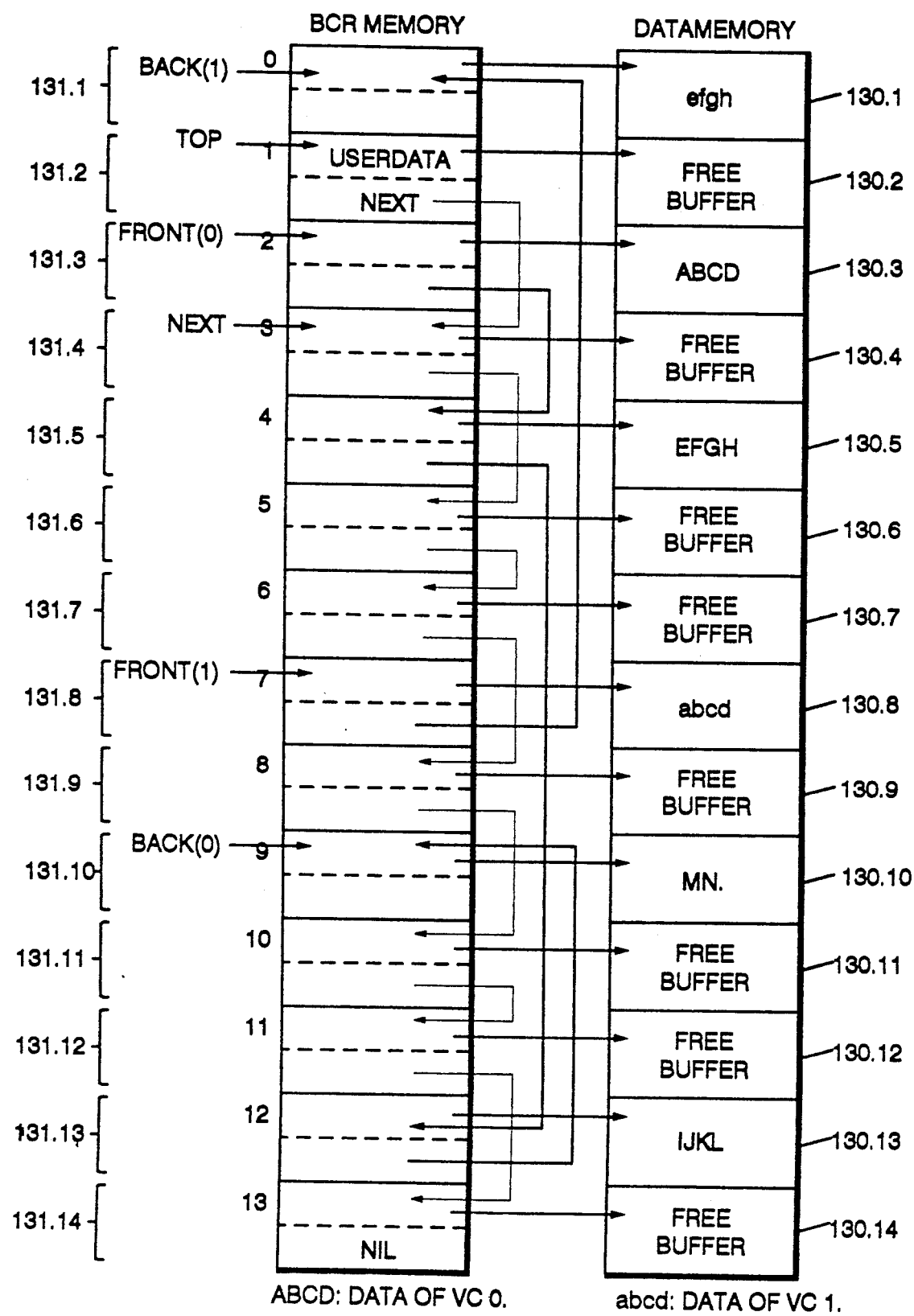
FIG. 10 shows the BCR memory with buffer-control records and a data memory with buffers.

The organization of the different linked lists in the BCR memory 111 and the buffers in the data memory 110 is illustrated in FIG. 10. In this example, two users, virtual channels (VC0, VC1) have access to the data memory 110. Data of the first virtual channel are shown as upper case script letters (ABCD . . . H) and data of the second virtual channel are shown as lower case block letters (abcd . . . h). As shown in FIG. 10, the buffers 130.3, 130.5, 130.10, and 130.13 contain data of virtual channel VC0, buffers 130.1, and 130.8 contain data of VC1, and the remaining buffers are free. The corresponding BCRs being stored in the BCR memory 111 have two fields. The first one is the UserData field, comprising the address of the corresponding buffer in the data memory 110, and the second field is a pointer, called "next," to another BCR. The BCRs of the free buffers 130.2, 130.4, 130.6, 130.7, 130.9, 130.11, 130.12, and 130.14 are kept in a free buffer linked list in the BCR memory 111. This linked list begins with BCR 131.2 and is linked by pointers to the following BCRs. The pointer field comprises the address of the next BCR, being schematically shown as light grey arrows from one BCR to another. The free buffer linked list behaves like a stack 123.1 shown in FIG. 9 and has a pointer "top" marking the first UserData field of the stack. For a stack no pointer is necessary at its end, such that the last BCR 131.14 of the stack ends with a "nil" field.

The BCRs of the buffers being allocated by VC0 and VC1 are kept in two FIFO linked lists. The first one starts with a "front(0)" pointer, see BCR 131.3, and ends at BCR 131.10 with a "back(0)" pointer. The second linked list is pointed to by "front(1)" and its last BCR 131.1 is pointed to by "back(1)." The next fields of the BCRs corresponding to the allocated buffers contain the addresses of the following BCRs, such that the lists of VC0 and VC1 behave like FIFO lists. The order of succession within FIFOs is illustrated by arrows.

The buffer addresses are put into the pointer queues (PTR Q's) 25, according to the buffer management described in the cited European Patent Application. Each virtual channel is supported by two PTR Qs, one for each traffic priority, where the addresses of buffers being allocated by said virtual channels are stored. The buffered data of a virtual channel are accessible by reading the addresses of the respective queue, such that these data can be routed to an addressee, i.e. a user. When a frame, consisting of multiple cells is completely received, an entry is made into an arrival queue. In FIG. 2B, two arrival queues 28.1, 28.2 are shown which support frames of different priority. This entry contains an index which PTR Q is used, such that the addresses where the frame is located in the buffers of storage 24 are retrieved. By means of the different arrival queues 28.1, 28.2 the adapter supports different traffic priorities. The traffic type (for example RESERVED vs. NON-REVERSED) determines into which arrival queue the entry is to be made.

The above cited re-align/pipeline unit 23.3, 23.4 re-aligns and delays data such that the cell payload is lined up with the memory bus, to prevent waste of storage space, and that the header processor 22 has time to generate the address of requested buffers. The user frames to be re-assembled are processed in order of their given priority by using the entries in the arrival queues 28.1, 28.2. The frame data is presented together with the switch source address at the lines 29, 30. Prior to making these data available at the output 29, the header processor 22 sends control information via line 31 to the addressee. For reading the data which have to be re-assembled into a user frame, the addresses of the buffers where the data are stored, are taken from the respective queue (PTR Q). The received cell payload which has to be routed to an addressee, may be received as part of multiple fixed length cells. The payload of these cells is stored in different storage sections (allocated buffers). For re-assembling a user frame these spread payloads are read from the different allocated buffers by taking their addresses from the respective PTR Q. This pointer management is transparent to the environment.

The micro processor interface 32 and the control micro-processor 33 of the receiver 20 and transmitter 21 are connected through a bus 34, such that messages can flow between the receiver and transmitter. For example, this is needed in case a retransmit command is received by the receiver 20 that has to be executed by the transmitter 21.

Typical fixed length cell size is less than 100 Bytes. In this invention the size of the fixed length cell and the position and size of the various control fields in the cell are chosen to keep hardware complexity to a minimum. For instance, all fields in the cell header have a fixed location and fixed size across all possible cells a coded in the TYPE field 40. This eliminates various multiplexers and their control in hardware. The cell size of 60 bytes allows easy implementation of the adapter with a hardware buswidth of 1, 2, 3, 4, 5 or 6 bytes. Details of the chosen cell structure are described in context with FIG. 3. ATM compatible fixed length cells 34 as well as all other fixed length cells 35 being used, are preceded by a fixed length header 36.1, 36.2 having a length of 7 bytes. All fixed length cells 35, except the ATM compatible cells 34, have a CRC (Cyclic Redundancy Check) byte 37 at their end. This check at the end of each cell improves the error detection of the data transmission. The lower part of FIG. 3 shows an exemplary header which is suited for the first embodiment. In this case, a three stage switch is supported by the address bits 38.1, 38.2, 38.3 (ADDRESS, ADDRESS 1, ADDRESS 2). The destination address is given in these address fields 38.1, 38.2, 38.3. The virtual channel identifier is transmitted in the VCID field 39. The control section of the header 36.1, 36.2 comprises a type field 40 indicating the type of the cell. The type field 40 can have the following values:
CONTROL
FIRST
MIDDLE
LAST
ONLY
ATM This type field 40 in the header allows to differentiate between control and data cells facilitating the described data mode mechanism. The fields 41-44 of the header 36.1, 36.2 support frames having different priority, allow to detect lost cells at the receiving side, and to control the reception of blocks of cells. The control packet allows the segmenting adapter to communicate to a control point without disrupting the normal data flow. ATM cells 34 can be transparently transmitted with the type field 40 set to ATM. In this case the adapter does not perform a cyclic redundancy check (ATM has its own CRC), and for redundancy reasons the type field 40 can be duplicated in the length field 41. In the ATM case all other control fields are unused.

Figure 4:
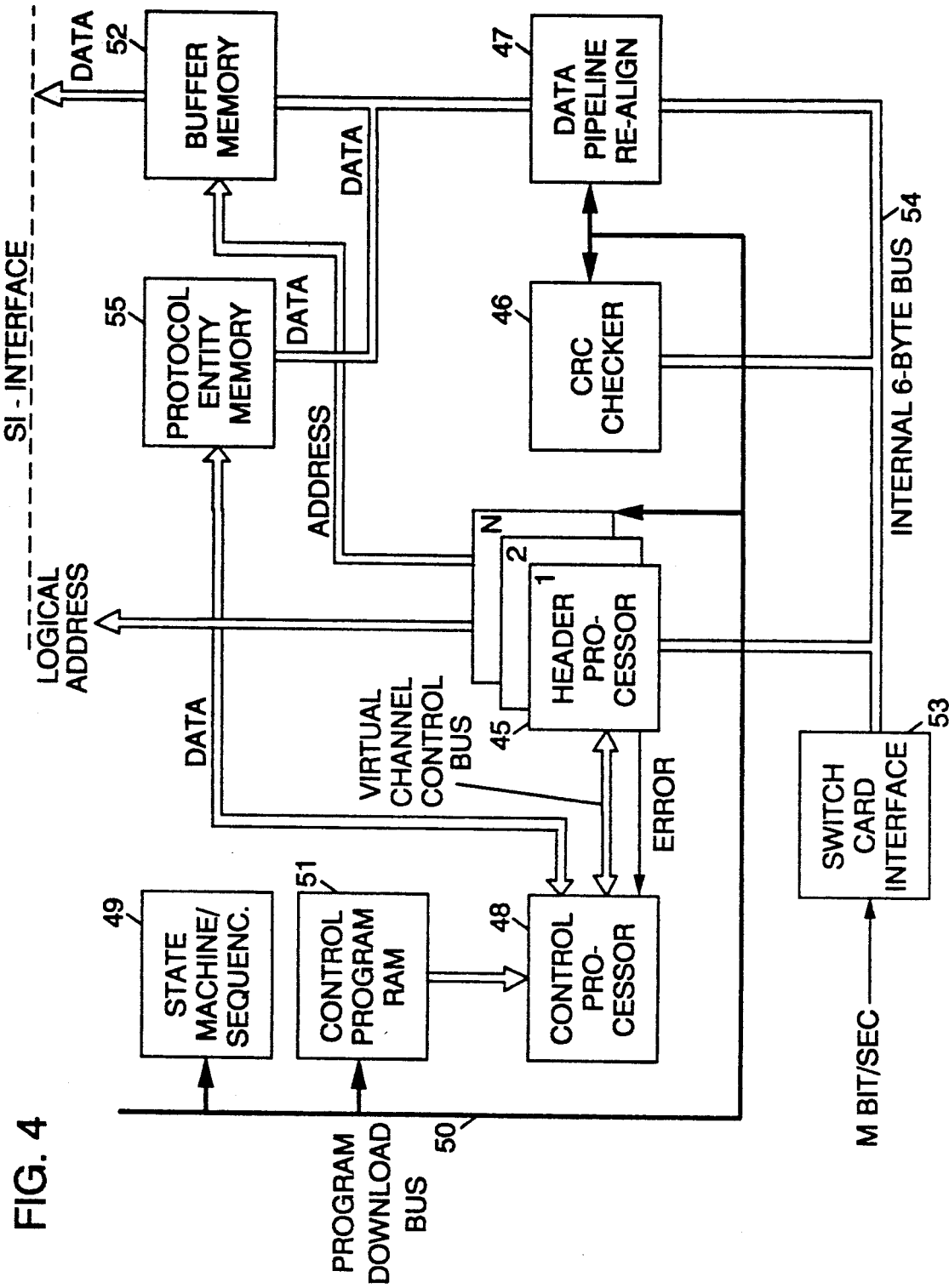
FIG. 4 shows a detailed block diagram of the receiver part of the protocol adapter.

The receiver portion of this embodiment is described in context with FIG. 4. The units header processor 45, CRC checker 46 and data pipeline/re-align 47 perform the on-the-fly processing required in the data mode. For operations outside the data mode the control processor 48 is used. As stated earlier, the control processor 48, state machine/sequencer 49, header processor 45, CRC checker 46 and data pipeline/re-align 47 units are programmable. The latter three units 45, 46, 47, however, are not von Neumann machines, but registers, counters, FIFO's and state machines, for which the structures are downloaded at configuration time via the program download bus 50. The control processor 48, however, is a more classical von Neumann machine, which may be optimized for implementing protocol primitives. The control program of the control processor 48 is stored in the control program RAM 51 (Random Access Memory). The programmability of these five units 45-49 allows to implement a variety of protocols with one adapter.

To achieve high speed, the principle of minimal data copying is applied, resulting in requiring only one fast memory 52 for data retention. Furthermore, a simple but effective algorithm for managing the allocation and release of storage sections, herein referred to as buffer management, is used.

A cell 34, 35, as shown in FIG. 3, arrives at the receiver part of the adapter and is converted from serial to parallel in the switch card interface 53. The entire header is fed via an internal 6 byte (48 bit) data bus 54 into the header processor 45, and the cell payload is clocked into the data pipeline and re-align unit 47.

Figure 5:
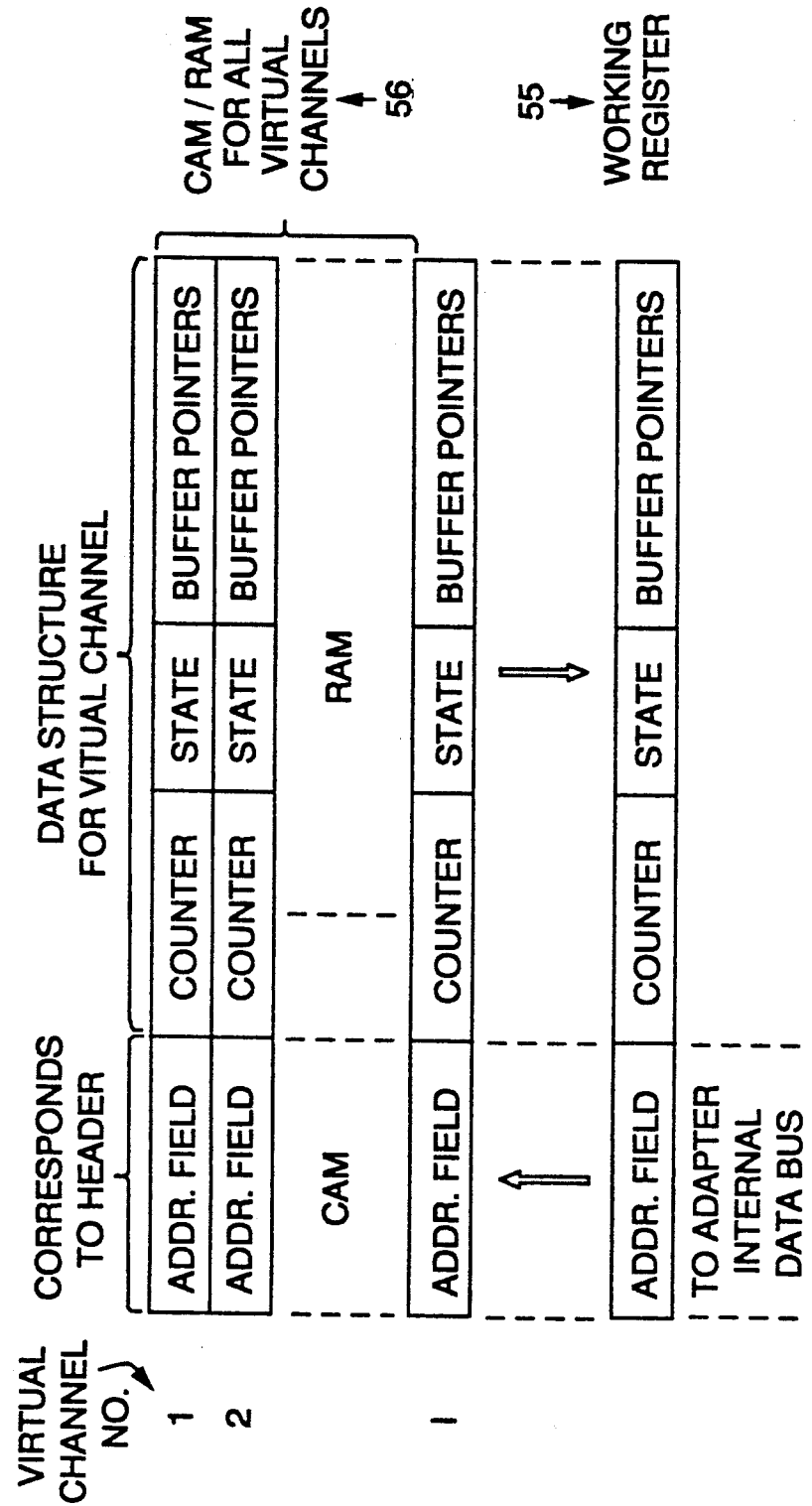
FIG. 5 is a schematic diagram of the header processor internal data structure.

Multiple virtual channels are supported with a data structure for each virtual channel in hardware registers in the header processor unit 45, shown in FIG. 5. This figure is exemplary to illustrate the principle. The address and VCID fields in the header are clocked into the working register 55 (lower left hand of FIG. 5) and this is compared with each entry in the header processor 45. Therefore a content addressable memory 56 (CAM) is employed. If the entry is not found, a new entry is generated into this CAM 56. If there is no more space in the CAM 56, then the cell is discarded and a message is sent to the control processor 48.

If a new CAM entry is generated, default values are put into the working registers 55. If the CAM entry was in existence then the complete internal state of the virtual channel is clocked into the working registers 55. The value of the control fields of the cell is checked with the state of the virtual channel being stored in a state field of said CAM 56. The state field contains the state of the virtual channel and the next state is computed with a finite state machine, being part of the header processor 45, in a fixed number of clock cycles. If the state of the virtual channel permits reception of data and the cell actually contains data, then the buffer manager (inside the header processor 45) ensures enough buffer memory space is available in the buffer memory 52. This is done in a fixed number of clock cycles. In conclusion, after a fixed number of clock cycles the header processor 45 selects the buffer memory 52 and presents the address where the cell data is to be stored. This number of fixed cycles is equal or less than the number of cycles to transfer a cell over the adapter internal bus 54. How the buffer manager (inside the header processor 45) generates the memory addresses in a fixed number of clock cycles is described in said European Patent Application. If the buffer manager can not or, based on various buffer allocation rules, wants not to grant a request for a buffer, the cell being received cannot be stored in the buffer memory and it will be discarded. The control processor 48 will be notified.

The data portion of a cell, payload in FIG. 3, is clocked into the data pipeline/re-alignment unit 47. The operation of this unit is described in context with FIG. 6. A fixed length cell 70 is shown at the top of this figure. The cell 70 is splitted into a number of bus cycles as indicated just below. In the first cycle the first part of the header 71 is clocked into the pipeline/re-align unit 47. This portion is indicated by 'A'. The second bus cycle contains payload 72, but not all bits on the internal data bus 54 are payload. The remainder of the header 71, indicated by 'B', is fed to the header processor 45. Portion 'C' that contains payload is clocked into the re-alignment register 73. The next two bus cycles contain only payload 72 such that the portions 'D-G' are clocked via re-alignment register 73 into the pipeline 74. Every time payload is clocked in this register 73, the current payload being stored there, is shifted into the pipeline 74. The purpose of the pipeline part 74 is to align the payload 72 with the buffer memory 52 after separation of payload 72 and header 71. In addition this part 74 delays the data for this memory 52 such that the header processor 45 has time to generate the address. The boundary between left and right portions of the pipeline register 74 is programmable, as well as the depth of the pipeline 74.

The following section presents details of the re-assembly mechanism according to the present invention. For re-assembly purposes, a state machine, located inside the header processor, maintains for each virtual channel a set of state variables, as examplified in FIG. 5. This state machine has the following states:
1. done
2. wait_next
3. buf_full
4. end Furthermore an error flag (Err_flg) remembers when errors occurred during the re-assembly. These errors are: CRC error (Cyclic Redundancy Check, to check for transmission errors), cell sequence error (to check the sequence of cells which form user frames) and buffer memory full error. A control cell does not affect the state of the virtual channel. These cells are directed to the protocol entity memory 55 as illustrated in FIG. 4. Also ATM cells do not affect the state machine, because no re-assembly is required. These cells are put into the buffer memory 52 unchanged.

Assume the virtual channel is in state 1 (done). In this case it will enter state 2 (wait_next) when it receives a First cell or it will enter state 4 (end) when it receives an only cell, which is a single cell. In state 1 middle or last cells are discarded without further action. When a cell has a CRC error, known only at the end of the cell, the error flag (Err-flg) is set to binary '1'. The block sequence number, given in field 43 (SEQ), shown in FIG. 3, is checked but a miscompare on a first cell will not cause setting the error flag but rather will generate a message 'missing block' to the μ-processor 48 (μ-processor 33, FIG. 2A equals μ-processor 48, FIG. 4). On middle and last cells an incorrect block sequence number will cause setting the error flag.

After receiving a first cell, the cell count is set to zero, and the sequence number in the virtual channel control register is set to the value of the SEQ field 43 of the received cell. When a middle cell is received, the state 2 (wait_next) is retained and when a last cell is received the state 4 (end) is entered.

A middle cell will cause the error flag to be set when either the SEQ number 43 is incorrect, the CRC 37 is incorrect or the COUNT field 44 in the cell 35 does not have the expected value. In state 2 (wait_next) the reception of a last cell will cause state 4 (end) to be entered.

To store user data of the payload field of a cell in the buffer memory 52, buffer management functions are performed. In case the buffer management determines that no more space is available for storing the data, state 3 (buf_full) is entered after reception of a first, middle or last cell. This also causes the error flag to be set. In case the error flag is set, the completion of a block results in sending a message to the μ-processor 48. A block is completed when state 4 (end) is entered, or when being in state 2 (wait_next) a first or only cell is received caused by a missing last cell.

The clock cycles of the header processor 45 of the first embodiment having a 6 byte data bus 54 are shown in FIG. 7. Because of this data bus 54 a cell with 60 bytes has to be divided into 10 bus cycles to transfer it across the bus 54. Various actions are to be performed but depending on the current and next state of a virtual channel, some actions must not be performed. However, all possible actions must be allocated to bus cycles in case they have to be performed. The table shown in FIGS. 7A-7C indicates the actions that are performed in the successive bus cycles, depending on the received cell type. In cycles 1 through 3 the address in the cell header, address fields 38.1-38.3 shown in FIG. 3, is taken to retrieve the state of the virtual channel. During cycle 1 the address part 38.1-38.3 of the header 36.1, 36.2 is clocked into the header processor 45. The corresponding entry in the CAM 56 is searched by comparing the virtual channel identifier with the entries stored in the CAM 56. In cycle 3 the state of this virtual channel is clocked into the working register 55 of the header processor 45. At the end of cycle 3 the current state of the channel is available together with the new inputs given by various fields in the received cell header 36.1, 36.2. This allows to compute the next state in cycle 4 with combinational logic such as a programmable logic array (PLA). In cycles 4 through 7 the buffer manager, being part of the header processor 45, calculates the RAM addresses of the buffer memory 52 (see European Patent Application 91810548.7). The addresses are presented to the RAM in cycle 8. The new state of the virtual channel is written back to the structure in cycle 11.

This cycle 11 overlaps cycle 1, this is possible because the action in cycle 11 does not conflict with that in 1, resulting in 10 processing cycles per cell. Updating the state to the virtual channel structure can only be performed in cycle 11 as the state is dependent on the outcome of the CRC checking. This outcome is only known after complete reception of a cell. For this reason a NOP (No Operation) is executed in bus cycle 9. The data is written to memory starting from this cycle.

When a cell is to be discarded, the data simply is not written into the RAM. Writing data into the RAM starts in cycle 9 as shown in FIG. 7C. Writing data into the RAM overlaps the first few cycles of the processing of the next cell, but this presents no conflict. The shown table implies that the pipeline 74 used in this embodiment, as shown in FIG. 6, is '9 cycles deep' such that the payload is delayed until the memory address is generated. This assignment of operations to bus cycles is kept as simple as possible in this embodiment.

With pipelining it would be possible to execute all of these actions in fewer bus cycles and therefore also allows shorter cells to be processed. The issue of the first embodiment is to show that the processing can be done in equal or less number of bus cycles. Different other embodiments are conceivable by adapting the described one to other protocols or using a simplified buffer management.

We claim:

1. In a data transmission system, a method for transforming fixed length cells, each cell having a payload, into user frames, each of said fixed length cells being preceded by a fixed size header, the payload and said fixed size header of each of said fixed length cells being processed separately, said method comprising the following steps:
receiving said fixed length cells,
feeding said fixed length cells in parallel into a parallel bus (54),
separating said payload of the fixed length cell from said fixed size header, said payload being transmitted along said parallel bus (54) via a realignment unit (47) to a buffer memory (52), processing said fixed size header separately to determine a storage address of a storage section in said buffer memory (52), shifting said payload to the boundary of said parallel bus by means of said re-alignment unit (47), buffering said payload in said storage section in said buffer memory (52) made accessible by said storage address after being shifted to the bus boundary, supporting at least one virtual channel by employing a control section corresponding to said virtual channel, said control section comprising queuing means whereby the storage addresses of the storage sections in said buffer memory (52) which have been allocated by said virtual channel are stored, the buffered payload of said virtual channel being accessible by reading said storage addresses from said buffer memory (52).

2. The method of claim 1, wherein said fixed length cell is transformed into a user frame by processing said fixed size header which has been separated from said payload, while transmitting said payload along said parallel bus (54) and shifting said payload to the boundary of said parallel bus (54), to determine if space for said payload is available in said buffer memory (52), by employing system state variables of said buffer memory (52), using said determined storage address of a storage section for writing said payload into said storage section of said buffer memory (52) if said space is available, and wherein user frames are generated, after buffering said payload in said storage section, by reading said payload from said storage section, using said storage address, forming a user frame according to a defined data transmission protocol, and transmitting said user frame.

3. The method of claim 2, wherein said storage address of a storage section is determined after a fixed number of bus cycles such that said payload which has been delayed during these bus cycles, can be stored in the storage section corresponding to said storage address.

4. The method of claim 2, wherein the storage addresses of storage sections are kept in queues such that the payload stored in these storage sections can be retrieved for the generation of said user frames by successively reading the storage addresses of the storage sections from said queues.

5. The method of claim 2, wherein fixed length cells of different priority are supported by storing the storage addresses of the storage sections where the payload of said fixed length cells has been stored in at least one queue such that for the generation of user frames the payload with the highest priority can be taken from the corresponding storage section prior to any payload with lower priority.

6. In a data transmission system, a method for transforming a user frame into a fixed length cell, said fixed length cell being preceded by a fixed size header, the method comprising the steps of:

buffering the payload of said user frame in a storage section of a buffer memory (24') using a storage address of said storage section, keeping said storage address in a queue (28.1', 28.2') such that said payload can be retrieved from said buffer memory (24') by taking said storage address from said queue (28.1', 28.2'), generating and processing said fixed size header separately prior to prefixing said payload with said fixed size header, taking said payload out of said buffer memory (24') using said corresponding storage address and inserting said payload into a fixed length cell, and transmitting said fixed length cell consisting of said payload preceded by said fixed size header.

7. The method of claim 6, wherein said user frame is transformed into said fixed length cell by reading said payload partly from said storage section, accessible using said storage address kept in said queue (28.1', 28.2'), concurrently, i.e. while taking said payload from said storage section, generating said fixed size header, forming said fixed length cell by insertion of a part of said payload, preceded by said fixed size header, and transmitting said fixed length cell.

8. The method of claim 7, wherein said payload is read from said storage section by taking its storage address from said queue (28.1', 28.2') and the payload is delayed during the generation of said fixed size header which is presented after a fixed number of clock cycles.

9. The method of claim 7, wherein said payload is realigned to a fixed length cell prior to the re-assembly of said fixed length cell such that said payload can be inserted into said fixed length cell directly adjacent to said fixed size header without wasting transmission capacity.

10. The method of claim 7, wherein user frames of different priority are supported by storing the storage addresses of the storage sections where each payload is stored in at least one queue (28.1', 28.2') such that for the generation of said fixed length cells the payload with the highest priority can be taken from the storage section where it has been stored by taking the storage address of said storage section from said queue (28.1', 28.2') prior to taking the storage address of the storage section of the next payload with lower priority from said queue (28.1', 28.2').

11. Apparatus for transforming fixed length cells into user frames, each of said fixed length cells being preceded by a fixed size header, comprising:

means for receiving a fixed length cell and transmitting said fixed length cell in parallel via a parallel bus, means (23) for separating the payload of said fixed length cell from said fixed size header transmitted via said parallel bus, header processor (22), connected to said parallel bus, for separately processing said fixed size header, to determine a storage address of a storage section in a buffer memory (24), re-alignment means for shifting said payload, received via said parallel bus, to the boundary of said parallel bus, means (23.3, 23.4) for buffering said payload, after said payload has been separated from said fixed size header and has been realigned, until said storage address is available, means (24, 26) for storing said payload in a storage section of said buffer memory (24) made accessible by said storage address, queuing means (25) for keeping said storage address corresponding to said payload in a queue, means for retrieving said payload from said storage section by successively taking the respective storage addresses from the queue of said queuing means (25), means for forming said user frame with said retrieved payload, in accordance with a predetermined data transmission protocol, and means for the transmission of said user frames.

12. The apparatus of claim 11, further comprising queuing means (28.1, 28.2) for supporting the transmission of fixed length cells with different priority by keeping the respective storage address in a queue of said queuing means, such that the payload with highest priority can be retrieved from said storage section of said buffer memory (24) by taking its storage address from said queue prior to any storage address of payload with lower priority.

13. A data transmission network comprising a cell handling switch fabric (11); and the apparatus of claim 11 for receiving the fixed length cells being routed through said switch fabric and for transforming the received fixed length cells into user frames prior to transmitting them.

14. Apparatus for transforming user frames, each comprising a payload into fixed length cells, each of said fixed length cells being preceded by a fixed size header, the apparatus comprising:

means for buffering the payloads of said user frames in a storage section of a buffer memory (24'), queuing means (28.1', 28.2') for keeping the storage address of said storage section in a queue being part of said queuing means, header processor (22') taking said storage address from the queue of said queuing means (28.1', 28.2') and generating a fixed size header, means for retrieving said payload from said buffer memory (24') using said storage address taken from said queue, means for forming said fixed length cell by prefixing a part of said retrieved payload with said header, and means for transmitting said fixed length cell.

15. The apparatus of claim 14, wherein said header processor (22') takes a storage address of payload with highest priority from the queue of said queuing means (28.1', 28.2') prior to storage addresses of payload with lower priority.

16. The apparatus of claim 14, further comprising a re-align unit (23') for re-aligning said payload taken from a storage section of said buffer memory (24') prior to prefixing it with said fixed size header such that said payload can be inserted into said fixed length cell directly adjacent to said fixed size header.

17. A data transmission network comprising a cell handling switch fabric (11); and the apparatus of claim 14 for transforming user frames into fixed length cells and transmitting the fixed length cells to said switch fabric (11).

* * * * *